J. W. SCHATZ.
PROCESS OR METHOD FOR THE MANUFACTURE OF SO-CALLED CUP RINGS FOR ANTIFRICTION BEARINGS.
APPLICATION FILED JUNE 21, 1919.
1,339,672.  
Patented May 11, 1920.
*Fig. 1*
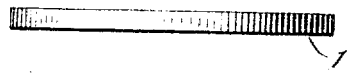
*Fig. 2*   *Fig. 2ᵃ*   *Fig. 2ᵇ*
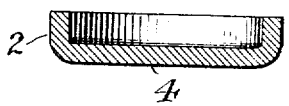  
*Fig. 3*   *Fig. 3ᵃ*   *Fig. 3ᵇ*
 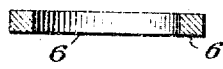 
*Fig. 4*   *Fig. 4ᵃ*   *Fig. 4ᵇ*
  
*Fig. 5*
Inventor.  
John W Schatz  
by Phillips Abbott Attorney.

UNITED STATES PATENT OFFICE.

JOHN W. SCHATZ, OF POUGHKEEPSIE, NEW YORK, ASSIGNOR OF ONE-THIRD TO HERMAN A. SCHATZ AND ONE-THIRD TO GROVER H. SCHATZ, BOTH OF POUGHKEEPSIE, NEW YORK.

PROCESS OR METHOD FOR THE MANUFACTURE OF SO-CALLED CUP-RINGS FOR ANTI-FRICTION-BEARINGS.

1,339,672.   Specification of Letters Patent.   Patented May 11, 1920.

Application filed June 21, 1919. Serial No. 305,796.

*To all whom it may concern:*

Be it known that I, JOHN W. SCHATZ, a citizen of the United States, and a resident of the city of Poughkeepsie, county of Dutchess, and State of New York, have invented a new and useful Process or Method for the Manufacture of So-Called "Cup-Rings" for Antifriction-Bearings, of which the following is a specification, reference being had to the accompanying drawings.

It has heretofore been customary to make the outer race or cup rings of antifriction bearings on turret or similar machines by reducing through proper cutting and turning operations tubular or solid bar metal so as to fashion or properly shape the cup rings therefrom. These operations have not only been slow and very expensive but also since there are apt to be defects in the tubing rings made from it are quite frequently defective especially since a small amount only of the tubular stock is required for each ring and when formed from solid bar metal there is an excessive waste of material and a great deal of expensive machine work necessary. Cup rings have also heretofore been made from sheet metal with welding, swaging and other time taking and more or less wasteful and expensive procedure.

Under this invention a process or method is practised which results in making most perfect cup rings from flat or sheet steel with a minimum of machine work and minimum of waste at the greatest speed and hence most reduced cost.

The procedure I prefer to follow in practising my invention consists in drawing up from a disk of sheet steel of proper gage or thickness and diameter a cup shaped blank adapted to make a large and heavy cup ring and producing a series of gradually reducing or smaller cup rings from the bottom of the cup after is has been cut therefrom, thus securing another disk smaller than the original one. The annulus remaining after the bottom of the cup has been cut out is then subjected to the action of suitable swaging or forming dies, the metal being either hot or cold, as preferred, and pressed into the form of the desired primary or larger cup ring, which thereafter requires only the usual grinding and other finishing operations to produce the finished product. From the peripheral part of the disk cut, as stated, from the bottom of the cup, an annulus is cut of such width as, when taken in connection with the thickness or gage of the metal, will afford sufficient material to make a cup ring of a smaller size than that made from the annulus or ring of the primary cup. This second annulus will as in the first instance be formed by the action of suitable dies into a cup ring of the next smaller size. In the same manner a series of annuli gradually reducing in diameter are cut from the gradually lessening disk which, in the first instance, was cut from the bottom of the primary cup. The width of each annulus will be determined by the thickness or gage of the metal and the weight or size of the cup rings desired. In this manner all of the sheet metal is used up for the making of cup rings until the diameter of the remaining center or final disk becomes so small that no further cup rings can be profitably made from it, but even it is not wasted because from it may be produced washers, lock nuts and the like.

The reason the primary or largest disk is drawn up into the form of a cup for the construction of the first or largest sized cup ring is so that after the bottom of the cup has been cut out there may be metal enough present in the resulting annulus from which to form the larger and heavier cup ring, and, as stated, in order that this may be more perfectly accomplished it is sometimes desirable to heat the metal.

Referring to the drawings, Figure 1 is an edgewise view of a steel disk, in this instance the primary disk; Figs. 2, 2ª, and 2ᵇ, are vertical sectional views showing the several stages in the manufacture of the larger and heavier cup ring; Figs. 3, 3ª and 3ᵇ are vertical sectional views showing the several stages in the manufacture from the disk cut from the bottom of the cup shown in Fig. 2, of a cup ring similar to but smaller than that shown in Fig. 2ᵇ; Figs. 4, 4ª and 4ᵇ are vertical sectional views showing the several stages in the manufacture of a cup ring smaller than that shown in Fig. 3ᵇ; Fig. 5 is an edgewise view, similar to Fig. 1, of the disk cut from the disk shown in Fig. 4.

Referring to the drawings 1 represents the primary disk, 2 the cup drawn up from the disk 1, 3 the annulus formed by the vertical sides of the cup, the bottom 4 having been cut from the cup 2 as a disk. 5 is a cup ring shaped by suitable forming dies from the annulus 3.

Referring to Figs 3, 3ª and 3ᵇ, 4 is, as stated above, the disk cut from the bottom of the cup 2. 6 is an annulus cut from the peripheral part of the disk 4, leaving the disk 7 (see Fig. 4). 8 is a cup ring similar to but smaller than the cup ring 5 formed by suitable shaping dies from the annulus 6.

Referring to Figs. 4, 4ª and 4ᵇ, 7, as stated above, is the disk remaining after the annulus 6 is cut from the disk 4. 9 is an annulus similar to but smaller than the annulus 6, cut from the peripheral part of the disk 7. 10 is a cup ring similar to but smaller than the cup ring 8 and formed in the same way. 11, see Fig. 5, is the central or final disk remaining after the annulus 9 is cut from the disk 7, and which if too small for further cup rings may be used in other manufacture.

A comparison of the ultimate or final disk 11 with the primary disk 1 will show how completely the metal has been utilized for the manufacture of cup or race rings, and it will be noted that since sheet steel is the most perfect and reliable of all forms of steel that the cup ring produced by my process will be of a high grade and unusually reliable.

That which has been described above and illustrated in the drawings shows one series of steps or procedure only in which my method or process may be practised. Obviously if the disk 4 cut from the bottom of the primary cup be large enough a cup similar to although smaller than the cup 2, may be formed therefrom instead of cutting the annulus 6 from the peripheral part of the disk 4, in other words, if the amount and weight of the metal present either in the original disk 1 or in successive disks formed as above stated, be suitable, cups may continue to be formed from the successively smaller disks until their size renders further production of cups undesirable and thereafter annuli may be cut from the successive disks as described.

It will be noted that a certain relation should exist between the thickness or gage of the metal and the width of the flanges of the cup in the one instance or the width of the several annuli in the other, depending upon the size and weight of the cup rings desired.

It will be understood that it makes no difference so far as this invention is concerned whether the primary disk is first formed into a cup from which the bottom is thereafter cut, or whether an annulus is cut from the peripheral part of the primary disk and thereafter formed into the cup ring, as stated above. The reason the first or largest disk is drawn up in the form of a cup as shown in Fig. 2 is, as stated above, so that there may be sufficient metal in the first annulus or ring formed by the punching of the bottom of the cup to make the larger and heavier cup ring, for it will be noted that the flange or vertical part of the cup contains more metal than would be contained in an annulus cut from the peripheral part of the primary disk unless the annulus were so wide as to be of undesirable shape in cross section, whereas for the manufacture of smaller cup rings the annulus or ring cut from the successively smaller disks will contain sufficient metal to make the correspondingly smaller cup rings. It will also be noted that the annuli cut from the sheet steel, whether they be made by cupping or flanging the steel and removing such flange, or cut from the peripheral part of the unflanged disk, must be unbroken and must also have continuous unbroken inner and outer surfaces, without projections or recesses therein, and when in the claims hereof I refer to an unbroken straight edged annulus I mean the structure just described.

It will be obvious to those who are familiar with such matters that modifications may be made in the details of procedure above described and illustrated without departing from the essentials of the invention. For example, a portion of the bottom of the cup 2 may be left integral with the vertical sides thereof, thus reducing the diameter of the disk cut from the bottom. This may sometimes be desirable if an unusual amount of metal be desired for the larger cup rings. Also the special form of the cup rings in cross section illustrated by me in Figs. 2ᵇ, 3ᵇ and 4ᵇ, is not essential. That is a cross sectional form of cup ring much used these days, but obviously any preferred cross section, depending upon the shape of the forming dies, may be produced. Also for many uses it will not be necessary to do much if any grinding or machine work on the finished cup rings since the forming dies will in many instances leave a sufficiently perfect structure to fulfil the desired purposes.

I claim:

1. The described method of making cup rings of differing size and strength from a sheet of metal of uniform thickness consisting in cutting a disk from the sheet, cutting from the peripheral part of the disk an unbroken straight-edged annulus of such width as will contain sufficient metal for the desired ring, subjecting the annulus to the action of appropriate forming dies to form a cup ring, and finishing the same.

2. The described method of making from a primary disk of sheet metal of uniform thickness cup rings successively smaller in size, consisting in successively cutting from the peripheral parts of the disk unbroken straight-edged annuli successively smaller in size and each of such width as will contain sufficient metal to form the successively smaller cup rings, subjecting the annuli to the action of appropriate forming dies to form the cup rings, and finishing the same.

3. The described method of making cup rings from a primary disk of sheet metal of uniform thickness consisting in flanging the edge of the disk, cutting off the unbroken flange and so much of the disk as will furnish sufficient metal for the desired ring, again flanging the reduced disk and again cutting therefrom the unbroken flange and so much of the disk as will provide sufficient metal for the next smaller ring desired, cutting from the periphery of the resulting reduced disk an unbroken straight-edged annulus of such width as will contain sufficient metal for a still smaller ring, subjecting the various resulting annuli to the action of appropriate forming dies to form the cup rings, and finishing the same.

4. The described method of making cup rings from a primary disk of sheet metal of uniform thickness consisting in flanging the edge of the disk and cutting off the flange and so much of the disk as will afford sufficient metal for the desired cup rings, until it is reduced to such size that unbroken straight-edged annuli of a width sufficient to afford metal for the desired cup rings may be cut from its periphery, subjecting the various resulting annuli to the action of appropriate forming dies to form the desired cup rings, and finishing the same.

In testimony whereof I have signed my name to this specification.

JOHN W. SCHATZ.